(12) United States Patent
Singh et al.

(10) Patent No.: US 9,658,860 B2
(45) Date of Patent: *May 23, 2017

(54) SYSTEM AND METHOD FOR OPTIMIZING BOOTUP PERFORMANCE

(71) Applicant: Dell Products L.P., Round Rock, TX (US)

(72) Inventors: Vishal Singh, Bangalore (IN); Muralidhara Mallur, Karnataka (IN)

(73) Assignee: Dell Products L.P., Round Rock, TX (US)

( * ) Notice: Subject to any disclaimer, the term of this patent is extended or adjusted under 35 U.S.C. 154(b) by 2 days.

This patent is subject to a terminal disclaimer.

(21) Appl. No.: 14/451,824

(22) Filed: Aug. 5, 2014

(65) Prior Publication Data

US 2016/0041829 A1 Feb. 11, 2016

(51) Int. Cl.
*G06F 13/12* (2006.01)
*G06F 13/38* (2006.01)
*G06F 9/44* (2006.01)
*G06F 11/34* (2006.01)

(52) U.S. Cl.
CPC ............ *G06F 9/4401* (2013.01); *G06F 11/34* (2013.01)

(58) Field of Classification Search
CPC .................................................... G06F 9/4401
USPC .......................................................... 710/68
See application file for complete search history.

(56) References Cited

U.S. PATENT DOCUMENTS

| | | | | |
|---|---|---|---|---|
| 7,849,241 | B2 * | 12/2010 | Gschwind | G06F 12/04 709/201 |
| 8,166,249 | B2 * | 4/2012 | Koehler | G06F 12/123 708/203 |
| 2003/0149793 | A1 | 8/2003 | Bannoura | |
| 2004/0006689 | A1 | 1/2004 | Miller | |
| 2006/0230170 | A1 | 10/2006 | Chintala | |
| 2007/0033322 | A1 * | 2/2007 | Zimmer | G06F 9/4401 711/103 |
| 2008/0162524 | A1 | 7/2008 | LaFrance-Linden | |
| 2009/0187899 | A1 * | 7/2009 | Mani | G06F 8/65 717/168 |
| 2011/0307640 | A1 | 12/2011 | Jones | |
| 2011/0320173 | A1 | 12/2011 | Levine | |
| 2012/0191893 | A1 | 7/2012 | Kuiper | |
| 2013/0139183 | A1 * | 5/2013 | Mallur | G06F 8/63 719/321 |
| 2013/0254441 | A1 * | 9/2013 | Kipnis | H03M 7/30 710/68 |
| 2015/0149737 | A1 | 5/2015 | Hobson | |

* cited by examiner

*Primary Examiner* — Idriss N Alrobaye
*Assistant Examiner* — Brooke Taylor
(74) *Attorney, Agent, or Firm* — Baker Botts L.L.P.

(57) ABSTRACT

A system and method of optimizing the performance of an information handling system is disclosed herein. One or more data samples are generated by rebooting an information handling system and identifying one or more files accessed during the bootup of the information handling system. An identifier and access frequency for each of the identified files are stored in a data sample. One or more data samples are merged into a merged data sample. A compression ratio is calculated for each of the identified files. One or more of the files identified in the merged data sample are selected for uncompression. The files selected for uncompression are uncompressed.

20 Claims, 10 Drawing Sheets

| FileName | AccessFrequency |
|---|---|
| File 1 | n1 |
| File 2 | n2 |
| File 3 | n3 |
| File 4 | n4 |
| File 5 | n5 |
| File 6 | n6 |
| File 7 | n7 |
| File 8 | n8 |
| File 9 | n9 |
| File 10 | n10 |
| File 11 | n11 |
| File 12 | n12 |
| File 13 | n13 |
| File 14 | n14 |
| File 15 | n15 |

FIG. 3

| FileName | AccessFrequency |
|---|---|
| File 1 | n16 |
| File 2 | n17 |
| File 3 | n18 |
| File 4 | n19 |
| File 5 | n20 |
| File 6 | n21 |
| File 16 | n22 |
| File 8 | n23 |
| File 9 | n24 |
| File 10 | n25 |
| File 17 | n26 |
| File 12 | n27 |
| File 13 | n28 |
| File 14 | n29 |

FIG. 4

| FileName | AccessFrequency |
|---|---|
| File 1 | n30 |
| File 2 | n31 |
| File 3 | n32 |
| File 4 | n33 |
| File 5 | n34 |
| File 6 | n35 |
| File 16 | n36 |
| File 8 | n37 |
| File 9 | n38 |
| File 10 | n39 |
| File 17 | n40 |
| File 12 | n41 |
| File 13 | n42 |
| File 14 | n43 |
| File 18 | n44 |
| File 19 | n45 |

FIG. 5

| FileName | AccessFrequency |
|---|---|
| File 1 | n1+n16+n30 |
| File 2 | n2+n17+n31 |
| File 3 | n3n18+n32 |
| File 4 | n4+n19+n33 |
| File 5 | n5+n20+n34 |
| File 6 | n35+n21+n6 |
| File 7 | n7 |
| File 8 | n8+n23+n37 |
| File 9 | n9+n24+n38 |
| File 10 | n39+n25+n10 |
| File 11 | n11 |
| File 12 | n41+n27+n41 |
| File 13 | n42+n13+n28 |
| File 14 | n43+n29+n14 |
| File 15 | n15 |
| File 16 | n22+n36 |
| File 17 | n40+n26 |
| File 18 | n44 |
| File 19 | n45 |

FIG. 6

| FileName | AccessFrequency | SizeofFile | SizeofFileonDisk | CompRatio |
|---|---|---|---|---|
| File 1 | n1+n16+n30 | s1 | d1 | s1/d1 |
| File 2 | n2+n17+n31 | s2 | d2 | s2/d2 |
| File 3 | n3n18+n32 | s3 | d3 | s3/d3 |
| File 4 | n4+n19+n33 | s4 | d4 | s4/d4 |
| File 5 | n5+n20+n34 | s5 | d5 | s5/d5 |
| File 6 | n35+n21+n6 | s6 | d6 | s6/d6 |
| File 7 | n7 | s7 | d7 | s7/d7 |
| File 8 | n8+n23+n37 | s8 | d8 | s8/d8 |
| File 9 | n9+n24+n38 | s9 | d9 | s9/d9 |
| File 10 | n39+n25+n10 | s10 | d10 | s10/d10 |
| File 11 | n11 | s11 | d11 | s11/d11 |
| File 12 | n41+n27+n41 | s12 | d12 | s12/d12 |
| File 13 | n42+n13+n28 | s13 | d13 | s13/d13 |
| File 14 | n43+n29+n14 | s14 | d14 | s14/d14 |
| File 15 | n15 | s15 | d15 | s15/d15 |
| File 16 | n22+n36 | s16 | d16 | s16/d16 |
| File 17 | n40+n26 | s17 | d17 | s17/d17 |
| File 18 | n44 | s18 | d18 | s18/d18 |
| File 19 | n45 | s19 | d19 | s19/d19 |

FIG. 7

| FileName | AccessFrequency | SizeofFile |
|---|---|---|
| File 1 | n1+n16+n30 | s1 |
| File 2 | n2+n17+n31 | s2 |
| File 3 | n3n18+n32 | s3 |
| File 4 | n4+n19+n33 | s4 |
| File 5 | n5+n20+n34 | s5 |
| File 6 | n35+n21+n6 | s6 |
| File 20 | n100 | s20 |
| File 23 | n103 | s23 |
| File 9 | n9+n24+n38 | s9 |
| File 10 | n39+n25+n10 | s10 |
| File 11 | n11 | s11 |
| File 21 | n101 | s21 |
| File 13 | n42+n13+n28 | s13 |
| File 22 | n102 | s22 |
| File 15 | n15 | s15 |
| File 16 | n22+n36 | s16 |
| File 17 | n40+n26 | s17 |
| File 18 | n44 | s18 |
| File 19 | n45 | s19 |

FIG. 8

| FileName | AccessFrequency | SizeofFile | SizeofFileonDisk | CompRatio |
|---|---|---|---|---|
| File 7 | n7 | s7 | d7 | s7/d7 |
| File 8 | n8+n23+n37 | s8 | d8 | s8/d8 |
| File 12 | n41+n27+n41 | s12 | d12 | s12/d12 |
| File 14 | n43+n29+n14 | s14 | d14 | s14/d14 |

FIG. 9A

| FileName | AccessFrequency | SizeofFile | SizeofFileonDisk | CompRatio |
|---|---|---|---|---|
| File 7 | n7 | s7 | d7 | s7/d7 |
| File 8 | n8+n23+n37 | s8 | d8 | s8/d8 |
| File 14 | n43+n29+n14 | s14 | d14 | s14/d14 |

FIG. 9B

| FileName | AccessFrequency | SizeofFile | Weight |
|---|---|---|---|
| File 8 | n8+n23+n37 | s8 | (n8+n23+n37)*s8 |
| File 14 | n43+n29+n14 | s14 | (n43+n29+n14)*s14 |
| File 7 | n7 | s7 | n7*s7 |

FIG. 9C

```
<?xml version="1.0" encoding="utf-8"?>
<xs:schema attributeFormDefault="unqualified" elementFormDefault="qualified" xmlns:xs="http://www.w3.org/2001/XMLSchema">
  <xs:element name="PerformanceData">
    <xs:complexType>
      <xs:sequence>
        <xs:element name="FileSet">
          <xs:complexType>
            <xs:sequence>
              <xs:element name="file">
                <xs:complexType>
                  <xs:sequence>
                    <xs:element name="filename" type="xs:string" />
                    <xs:element name="fileFrequency" type="xs:unsignedByte" />
                    <xs:element name="fileCompressionRatio" type="xs:decimal" />
                    <xs:element name="fileSize" type="xs:unsignedShort" />
                    <xs:element name="fileWeight" type="xs:unsignedShort" />
                    <xs:element name="FileOPFlag" type="xs:string" />
                  </xs:sequence>
                </xs:complexType>
              </xs:element>
            </xs:sequence>
          </xs:complexType>
        </xs:element>
      </xs:sequence>
    </xs:complexType>
  </xs:element>
</xs:schema>
```

FIG. 10

```
<?xml version="1.0" encoding="UTF-8"?>
- <PerformanceData>
    - <FileSet>
        - <file>
            <filename>file1</filename>
            <fileFrequency>6</fileFrequency>
            <fileCompressionRatio>1.6</fileCompressionRatio>
            <fileSize>1024</fileSize>
            <fileWeight>6144</fileWeight>
            <FileOPFlag>C</FileOPFlag>
          </file>
      </FileSet>
  </PerformanceData>
```

FIG. 11

SYSTEM AND METHOD FOR OPTIMIZING BOOTUP PERFORMANCE

TECHNICAL FIELD

This disclosure relates generally to information handling systems and, more particularly, to networks having multiple client devices.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more information handling systems, data storage systems, and networking systems.

BRIEF DESCRIPTION OF THE DRAWINGS

For a more complete understanding of the present invention and its features and advantages, reference is now made to the following description, taken in conjunction with the accompanying drawings, in which:

FIGS. 3, 4, and 5 depict examples of data sets produced by particular embodiments;

FIG. 6 depicts a merged data set;

FIG. 7 depicts a merged data set with compression ratios;

FIG. 8 depicts an example of a data set;

FIGS. 9A-9C depicts examples of data sets produced by a particular embodiment;

FIG. 10 depicts an examplary XML schema used;

FIG. 11 depicts an instance of an XML file;

DETAILED DESCRIPTION

Figure 1:
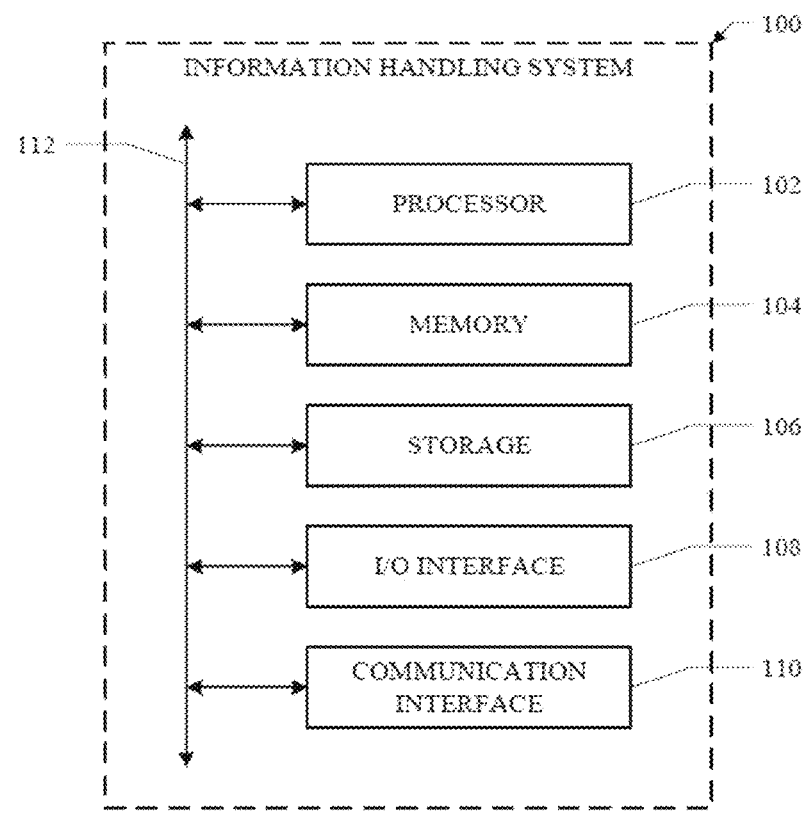
FIG. 1 is a block diagram of selected elements of an information handling system.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Figure 2:
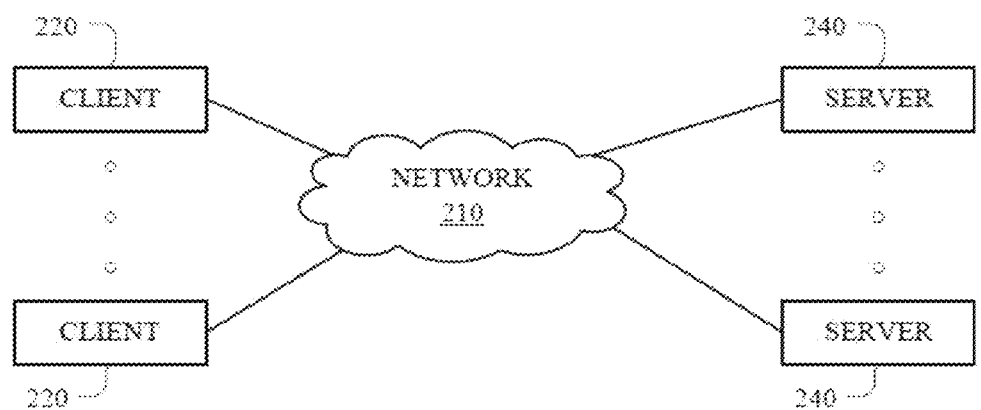
FIG. 2 is an example of a network environment.

Particular embodiments are best understood by reference to FIGS. 1-2, wherein like numbers are used to indicate like and corresponding parts.

FIG. 1 illustrates an example information handling system 100. In particular embodiments, one or more information handling systems 100 perform one or more steps of one or more methods described or illustrated herein. In particular embodiments, one or more information handling systems 100 provide functionality described or illustrated herein. In particular embodiments, software running on one or more information handling systems 100 performs one or more steps of one or more methods described or illustrated herein or provides functionality described or illustrated herein. Particular embodiments include one or more portions of one or more information handling systems 100. Herein, reference to an information handling system may encompass a computing device, and vice versa, where appropriate. Moreover, reference to an information handling system may encompass one or more information handling systems, where appropriate.

This disclosure contemplates any suitable number of information handling systems 100. This disclosure contemplates information handling system 100 taking any suitable physical form. As example and not by way of limitation, information handling system 100 may be an embedded information handling system, a system-on-chip (SOC), a single-board information handling system (SBC) (such as, for example, a computer-on-module (COM) or system-on-module (SOM)), a desktop information handling system, a laptop or notebook information handling system, an interactive kiosk, a mainframe, a mesh of information handling systems, a mobile telephone, a personal digital assistant (PDA), a server, a tablet information handling system, or a combination of two or more of these. Where appropriate, information handling system 100 may include one or more information handling systems 100; be unitary or distributed; span multiple locations; span multiple machines; span multiple data centers; or reside in a cloud, which may include one or more cloud components in one or more networks. Where appropriate, one or more information handling systems 100 may perform without substantial spatial or temporal limitation one or more steps of one or more methods described or illustrated herein. As an example and not by way of limitation, one or more information handling systems 100 may perform in real time or in batch mode one or more steps of one or more methods described or illustrated herein. One or more information handling systems 100 may perform at different times or at different locations one or more steps of one or more methods described or illustrated herein, where appropriate.

In particular embodiments, information handling system 100 includes a processor 102, memory 104, storage 106, an input/output (I/O) interface 108, a communication interface 110, and a bus 112. Although this disclosure describes and illustrates a particular information handling system having a particular number of particular components in a particular arrangement, this disclosure contemplates any suitable information handling system having any suitable number of any suitable components in any suitable arrangement.

In particular embodiments, processor 102 includes hardware for executing instructions, such as those making up a computer program. As an example and not by way of limitation, to execute instructions, processor 102 may retrieve (or fetch) the instructions from an internal register, an internal cache, memory 104, or storage 106; decode and execute them; and then write one or more results to an internal register, an internal cache, memory 104, or storage 106. In particular embodiments, processor 102 may include one or more internal caches for data, instructions, or addresses. This disclosure contemplates processor 102 including any suitable number of any suitable internal caches, where appropriate. As an example and not by way of limitation, processor 102 may include one or more instruction caches, one or more data caches, and one or more translation lookaside buffers (TLBs). Instructions in the instruction caches may be copies of instructions in memory 104 or storage 106, and the instruction caches may speed up retrieval of those instructions by processor 102. Data in the data caches may be copies of data in memory 104 or storage 106 for instructions executing at processor 102 to operate on; the results of previous instructions executed at processor 102 for access by subsequent instructions executing at processor 102 or for writing to memory 104 or storage 106; or other suitable data. The data caches may speed up read or write operations by processor 102. The TLBs may speed up virtual-address translation for processor 102. In particular embodiments, processor 102 may include one or more internal registers for data, instructions, or addresses. This disclosure contemplates processor 102 including any suitable number of any suitable internal registers, where appropriate. Where appropriate, processor 102 may include one or more arithmetic logic units (ALUs); be a multi-core processor; or include one or more processors 102. Although this disclosure describes and illustrates a particular processor, this disclosure contemplates any suitable processor.

In particular embodiments, memory 104 includes main memory for storing instructions for processor 102 to execute or data for processor 102 to operate on. As an example and not by way of limitation, information handling system 100 may load instructions from storage 106 or another source (such as, for example, another information handling system 100) to memory 104. Processor 102 may then load the instructions from memory 104 to an internal register or internal cache. To execute the instructions, processor 102 may retrieve the instructions from the internal register or internal cache and decode them. During or after execution of the instructions, processor 102 may write one or more results (which may be intermediate or final results) to the internal register or internal cache. Processor 102 may then write one or more of those results to memory 104. In particular embodiments, processor 102 executes only instructions in one or more internal registers or internal caches or in memory 104 (as opposed to storage 106 or elsewhere) and operates only on data in one or more internal registers or internal caches or in memory 104 (as opposed to storage 106 or elsewhere). One or more memory buses (which may each include an address bus and a data bus) may couple processor 102 to memory 104. Bus 112 may include one or more memory buses, as described below. In particular embodiments, one or more memory management units (MMUs) reside between processor 102 and memory 104 and facilitate accesses to memory 104 requested by processor 102. In particular embodiments, memory 104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 104 may include one or more memories 104, where appropriate. Although this disclosure describes and illustrates particular memory, this disclosure contemplates any suitable memory.

In particular embodiments, storage 106 includes mass storage for data or instructions. As an example and not by way of limitation, storage 106 may include a hard disk drive (HDD), a floppy disk drive, flash memory, an optical disc, a magneto-optical disc, magnetic tape, or a Universal Serial Bus (USB) drive or a combination of two or more of these. Storage 106 may include removable or non-removable (or fixed) media, where appropriate. Storage 106 may be internal or external to information handling system 100, where appropriate. In particular embodiments, storage 106 is non-volatile, solid-state memory. In particular embodiments, storage 106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 106 taking any suitable physical form. Storage 106 may include one or more storage control units facilitating communication between processor 102 and storage 106, where appropriate. Where appropriate, storage 106 may include one or more storages 106. Although this disclosure describes and illustrates particular storage, this disclosure contemplates any suitable storage.

In particular embodiments, I/O interface 108 includes hardware, software, or both, providing one or more interfaces for communication between information handling system 100 and one or more I/O devices. Information handling system 100 may include one or more of these I/O devices, where appropriate. One or more of these I/O devices may enable communication between a person and information handling system 100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 108 for them. Where appropriate, I/O interface 108 may include one or more device or software drivers enabling processor 102 to drive one or more of these I/O devices. I/O interface 108 may include one or more I/O interfaces 108, where appropriate. Although this disclosure describes and illustrates a particular I/O interface, this disclosure contemplates any suitable I/O interface.

In particular embodiments, communication interface 110 includes hardware, software, or both providing one or more interfaces for communication (such as, for example, packet-based communication) between information handling system 100 and one or more other information handling systems 100 or one or more networks. As an example and not by way of limitation, communication interface 110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 110 for it. As an example and not by way of limitation, information handling system 100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, information handling system 100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Information handling system 100 may include any suitable communication interface 110 for any of these networks, where appropriate. Communication interface 110 may include one or more communication interfaces 110, where appropriate. Although this disclosure describes and illustrates a particular communication interface, this disclosure contemplates any suitable communication interface.

In particular embodiments, bus 112 includes hardware, software, or both coupling components of information handling system 100 to each other. As an example and not by way of limitation, bus 112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 112 may include one or more buses 112, where appropriate. Although this disclosure describes and illustrates a particular bus, this disclosure contemplates any suitable bus or interconnect.

FIG. 2 illustrates an example configuration of networked information handling systems (e.g. client devices and servers). In particular embodiments, one or more client devices 220 and one or more servers 240 are connected via network 210. Network 210 may be a public network or a private (e.g. corporate) network. Additionally, network 210 may, for example, be a Local Area Network (LAN), a Wide Area Network (WAN), a wireless network, the Internet, an intranet or any other suitable type of network. In particular embodiments, network 210 may include one or more routers for routing data between client devices 220 and/or servers 240. A device (e.g., a client device 220 or a server 240) on network 210 may be addressed by a corresponding network address including, for example, an Internet protocol (IP) address, an Internet name, a Windows Internet name service (WINS) name, a domain name or other system name. In particular embodiments, network 210 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client devices 220 may communicate with one or more servers 240 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Client device 220 may be a desktop computer, a laptop computer, a tablet computer, a handheld device, a mobile phone, a kiosk, a vending machine, a billboard, or any suitable information handling system. In particular embodiments, a client device 220 is an embedded computer and may have flash memory (e.g. a solid state drive) instead of a hard disk drive. In particular embodiments, a client device 220 is a thin client having limited processing capabilities and limited storage, and such a thin client may require minimal management and updates. A client device 220 may communicate with a server 240 via one or more protocols such as Hypertext Transfer Protocol (HTTP), Hypertext Transfer Protocol Secure (HTTPS), File Transfer Protocol (FTP), Common Internet File System (CIFS), Independent Computing Architecture (ICA) protocol (developed by Citrix Systems, Inc.), Remote Desktop Protocol (RDP) (developed by Microsoft Corporation), or any suitable protocol or combination of protocols.

A server 240 may include one or more of: a computing device, a desktop computer, a laptop computer, a database, a corporate server, a repository server, a configuration application server, a domain name system (DNS) server, a dynamic host configuration protocol (DHCP) server, a virtual machine (e.g., VMware® Virtual Machine), a desktop session (e.g., Microsoft Terminal Server), a published application (e.g., Microsoft Terminal Server), or any suitable information handling system. As an example, a private (e.g. corporate) network may include a device manager server and a repository server each configured to communicate with multiple client devices 220 across one or more domains, sites, or subnets of network 210. In particular embodiments, a server 240 may include one or more servers, or functions of one or more servers. A client device 220 may access software resources provided by a server 240 such as, for example, operating systems, add-ons, content, or any other suitable data, applications, or images. In particular embodiments, a client 220 may access resources provided by a server 240 only after providing suitable authentication information. Alternatively, a server 240 may provide software or other resources automatically to one or more client devices 220.

It may be desirable, in the case of a private (e.g. corporate) network including multiple sites or subnets to deploy software (including, e.g., all or part of one or more operating systems, applications, add-ons, or data) to one or more client devices 220 across one or more sites or subnets. The client devices 220 may, for example, be located remotely from one or more servers 240 (including, e.g., device managers or resource repositories), and as such, there may be challenges in deploying software or other resources to the client devices. As an example, limited connectivity or limited speed due to bandwidth constraints or network latencies may create delays in deploying software. As another example, remote sites or subnets may not include managed components or may not have any personnel with information technology expertise necessary to implement software deployment to client devices at the sites or subnets. Additionally, as the size of operating system images or other content (e.g. videos) increases, deploying software or other data to remote sites or subnets may be further delayed. These issues may be further exacerbated in the case of embedded computers such as thin clients, which may have limited processing capability and limited storage space. Traditional approaches involving using a static remote software repository for each subnet or site may not be feasible due to cost or management and monitoring requirements.

In particular embodiments, one or more servers 240 of a network 210 may include a device manager that may manage one or more client devices 220 (e.g. thin clients) of one or more sites or subnets of the network. The device manager may, for example, be a software-based management tool that allows for software imaging, software updates, and software configurations to be deployed to the clients from one or more servers. The device manager may also perform any other suitable management function to manage client devices including, for example, enabling or performing (e.g. automatically) device discovery, tracking of assets (e.g. hardware or software inventory) at client devices, monitoring the status or health of client devices, applying one or more policies to client devices (including, e.g., network settings of the client devices), or remote administration and shadowing of client devices. The device manager may deliver any suitable resources including, for example, operating systems, add-ons, content, or any other suitable data, applications, or images to one or more thin client devices 220 of network 210.

In particular embodiments, a client device such as client device 220 (e.g. a thin client) may be designed with minimal or limited storage capacity (e.g. in a hard disk). The client device may be required, however, to run an operating system such as WINDOWS EMBEDDED or WINDOWS SERVER, but the footprint of such an operating system may grow over time with newer releases or updates. Hence, client devices may, over time, begin to run low on free storage space (e.g. in the hard disk). Unwanted files may be deleted or full volume compression of the storage medium (e.g. the hard disk) may be implemented to increase available storage space. However, full volume compression may introduce performance shortcomings (e.g. increased number of instruction cycles required to compress/uncompress data in the volume) from the point of view of an end user of the client device. In particular embodiments, optimized volume compression may be implemented to reduce effective disk usage on a client device while minimizing impact on system performance.

In particular embodiments, system boot performance of a client device may be improved via selective compressing and uncompressing of data in the storage volume (e.g. hard disk) of the client device. In such embodiments, data is sampled during system boot-up of the client device. During boot-up of the client device system, a first set of raw data regarding disk activity (e.g. reads or writes to the disk) is collected (e.g. by one or more counter APIs) for use in the initial process of performance improvement. In this phase, file access details for data or files resident on the storage volume of the client device are collected during the system boot process. In particular embodiments, multiple data sets or samples of file access details are collected during one or more boot-up processes, to allow for more consistent and effective data collection. The number of data samples may be taken as input and this number may be used to trigger that same number of reboots of the client device system. During each of those boot-ups, file/data access frequencies (for each file/unit of data accessed) are collected. Each boot-up data sample may be saved in a separate file (e.g. a temporary file that is unknown to a user of the client device). FIGS. 3, 4, and 5 represent examples of data sets or samples that may be produced by a particular embodiment. Each data set may comprise a plurality of entries, each entry corresponding to a file accessed during a sampling interval. An entry may contain an identifier for the file accessed (e.g. FileName), and the number of times the file was accessed (e.g. AccessFrequency).

Once the desired number of data samples has been collected, these samples may be merged together into a file (e.g. an XML file), which will contain both identifying information (e.g. names) of files accessed during boot-up and their respective frequencies of access. The data gathered in system boot-up may, for example, be independent of any specific application that may run on the client device and may, for example, depend on what mode the client device is booted into or what drivers, applications, or startup items are loaded at the time of data measurement. Additionally, the data gathered during system boot-up may include data that may not be measurable once the system is fully booted up.

In particular embodiments, a tool or utility (e.g. a system service of the client device) may start upon boot-up of the client device and may include one or more major modules. The tool or utility may include a data sampler module, which may include a lightweight processing thread (e.g. running in the background) that collects filenames of files which have been accessed, as well as each file's corresponding frequency of access, and stores this information in a file (e.g. an XML file) corresponding to the particular boot cycle. The tool or utility may also include a boot data sampler module, which takes as input a desired number of samples (e.g. input by a user or administrator of the client device). The boot data sampler module may restart the client device based on the desired number of samples (e.g. if 6 samples are desired, then the boot data sampler module may restart the client device 6 times). During each boot-up of the client device, the boot data sampler module may collect the filenames of files which have been accessed, as well as each file's corresponding frequency of access, and stores this information in a file (e.g. an XML file) corresponding to the particular boot cycle. This data may be collected using boot performance counters that keep track of the number of boot cycles (e.g. stopping once the number of the present boot cycle equals the desired sample count). Sampling may be initiated based on a schedule for boot performance optimization.

Example pseudocode for sampling data during system boot-up of the client device is as follows (e.g. as performed by a boot data sampler module of a tool or utility of the client device):

INPUT:
Data Sample Count(n)
OUTPUT:
Files which are accessed during System boot with frequency of file being accessed in XML format, for the specified number of Data Sample Counts, Boot.xml
PROCEDURE:
Step 1: Input count of data samples.
Step 2: If n<=0, goto step 9, else continue.
Step 3: Restart the system.
Step 4: During the System boot process retrieve the file names and frequency (no. of times a system file will be accessed during the boot process) of files which are being accessed using Boot performance Counters API.
Step 5: Store File list in a xml file, Boot(n).xml
Step 6: n=n-1.
Step 7: While (n>0) goto step 3.
Step 8: Merge Boot(i).xml, where (i=1;i<=n;i++) and store in one Final XML and name it as Boot.xml.
Step 9: End In particular embodiments, application performance (e.g. from the point of view of an end user) of a client device may be improved via selective compression and uncompressing of data in the storage volume (e.g. hard disk) of the client device. In these embodiments, data may be sampled (e.g. collected by counter APIs) during the running of one or more applications on the client device. In particular embodiments, multiple data samples may be gathered to get more consistent and effective data regarding file accesses over a particular (e.g. user-specified) time period. Information about the trend of file accesses (e.g. during productivity hours or at any point in time) may be obtained, and this data may assist in selecting which files to process for compression or uncompressing. When gathering data during the running of one or more applications on the client device, two inputs are required. First, the duration of one sampling "unit" (e.g. one hour) is required (and this value may be defined by a user). Second, the number of samples desired for collection must be specified. Once the process of data sampling is initiated, file access frequencies for each file being accessed during each sampling unit is collected. This data may be saved in a file (e.g. a temporary file). Once, the desired number of samples (e.g. sampling units) have been collected, the samples may be merged together (e.g. in an XML file) in a file that includes the files accessed (and their respective frequencies of access) during the running of one or more applications on the client device. In particular embodiments, there is no need for a system restart between each sampling unit (e.g. as with the gathering of system boot-up data). Additionally, the gathering of data samples may, in particular embodiments, occur continuously (e.g. as a service that runs all the time once the client device is booted up). The merging of data samples may, in particular embodiments, occur at a particular time (e.g. at the end of the business day), which may be specified by a user or administrator of the client device.

The tool or utility (e.g. a system service of the client device) described herein may include an application data sampler module, which takes as input a desired sample length and a desired number of samples (e.g. a sample interval length and a sample count). The application data sample module may collect the filenames of files that have been accessed (and their corresponding file access frequencies) and store this information in a file (e.g. an XML file) corresponding to the particular sample number. This data may be collected using performance counters that keep track of the sample interval and sample counts. This data may be in the form depicted in FIGS. 3, 4, and 5, as described previously.

Example pseudocode for sampling data during application runtime of the client device is as follows (e.g. as performed by an application data sampler module of a tool or utility of the client device):

INPUT:
Data Sample Count(n)
Data Sample Interval(t)
OUTPUT:
Files which are accessed during User Application Experience for a defined sampling interval, for the specified number of Data Sample Counts. App.xml
PROCEDURE:
Step 1: Input Data Sample Count(n) & Data Sample Interval(t).
Step 2: If n=0||t=0, goto step 9, else continue.
Step 3: Start Data Collection.
Step 4: During User Application Experience retrieve the file names and frequency (no. of times files being accessed) of files being accessed using System performance counters API.
Step 5: Store this data in XML, App(n).xml
Step 6: n=n-1.
Step 7: While (n>0), goto step 3.
Step 8: Merge App(i).xml, where (i=1;i<=n;i++) and store in one Final XML and name it as App.xml.
Step 9: End Once data samples are gathered, whether they are samples gathered during system boot-up or samples gathered during application runtime on the client device, these data samples may be merged or otherwise consolidated. For example, multiple system-boot up samples (taken, for example, during multiple system boot-up processes of the client device) may be merged together in one file. As another example, multiple application runtime samples (taken, for example, during one or more sampling periods of one or more lengths during application runtime of the client device) may be merged together in one file. In particular embodiments, the first data sample gathered is a reference, and for each of the N desired samples after the first data sample (e.g. samples 2 through N), the file access frequency information is added (e.g. appended) to the reference file. Once sample merging is complete for all the data samples, the result is a file with entries including filenames of those files that have been accessed during one or more of the samples (and corresponding access frequencies). The data in this file spans all the reboots (if the samples are gathered during system boot-up) or spans the effective sample timeline (e.g. the total sampling duration of all the samples, if the samples are gathered during application runtime).

The tool or utility (e.g. a system service of the client device) described herein may include a merge module, which may be a low-priority processing thread that performs the merging of collected data samples (collected, e.g. by the data sampler module) during a suitable time (e.g. during an idle state of the client device). Example pseudocode for merging collected data samples is as follows (e.g. as performed by a merge module of a tool or utility of the client device):

INPUT:
Boot(i).xml/App(i).xml, where (i=2;i<=n;i++) & n is the number of sample count. For simplicity we'll define File(i)=Boot(i).xml/App(i).xml OUTPUT:
XML file, containing the list of files, for un compression. Boot.xml/App.xml PROCEDURE:
Step 1: Read File(1).xml and File(i).xml
Step 2: For each File entry in File(1).xml, if there is an entry in File(i).xml, add the frequency of access of the entry in File(i).xml with that of File(1).xml, else update the file with the corresponding entry and it's frequency in File(1).xml.
Step 3: while (i=2;i<=n;i++). Goto Step 1
Step 4: Rename File(1).xml as Boot.XML/App.XML.

FIG. 6 is a representation of a merged or consolidated data set that results from combining the first, second, and third data sets represented by FIGS. 3, 4, and 5 respectively.

In particular embodiments, once the data samples are merged, a compression ratio may be calculated for each file (or other data) entry of the merged data. The compression ratio may be obtained based on two attributes for a compressed file: 1) the size of the file on a storage volume of the client device (e.g. disk) when uncompressed and 2) the size of the file on the storage volume when compressed. The compression ratio for a file is equal to the size of the uncompressed form of the file divided by the size of the compressed form of the file. Once the compression ratio for an entry in the merged dataset is calculated, the compression ratio may be appended to the entry for that file in the combined dataset. That is, in the final merged file (e.g. an XML file), the entry for a specific data file may include metadata about the file (including, e.g. the filename), access frequency of the file across all the data samples in the merged data file, and a compression ratio for the file. Example pseudocode for calculating a compression ratio (e.g. performed by an analyzer module of the tool or utility of the system of the client device, described herein) is as follows:

INPUT:
Boot.xml/App.xml

OUTPUT:
The compression ratio for each entry in Boot.xml/App.xml.

PROCEDURE:
Step 1: Read Boot.xml or App.xml
Step 2: For each file in the xml (Boot.xml OR app.xml),
(a) Read the Size of File (Sf)
(b) Read the Size of File on Disk (Sd)
(c) Obtain the compression ratio (CR), CR=(Sf/Sd)
Step 3: Update the Compression Ratio (CR), for each file entry in Boot.xml/App.xml, as an attribute.

FIG. 7 is a representation of the output of a particular embodiment calculating compression ratios for the dataset and files depicted in FIG. 6. In the particular embodiment, the size of each file and the size of each file on disk are additional attributes (e.g. SizeofFile and SizeofFileonDisk, respectively) stored in a Boot.xml/App.xml file.

In particular embodiments, once the compression ratio has been calculated for each file (or other data unit) in the merged data set, old data samples and new data samples may be analyzed. This analysis may later be used to determine whether any files (or other data units) are suitable candidates for compression. For example, files which were previously uncompressed but are now are not being used as frequently may be compressed in order to save disk space. Additionally, recently-used files or newer files (as indicated by the latest data samples in the merged data set), may be uncompressed to enhance system performance. This comparison of older data samples and newer data samples may provide a clearer picture of the deviation in the files being accessed now versus those files that were previously being accessed. In one embodiment, those files that were both accessed in older data samples and not accessed in newer data samples may be compressed to save disk space. Example pseudocode for analyzing data sets for compression (e.g. performed by an analyzer module of the tool or utility of the system of the client device, described herein) is as follows:

INPUT:
Boot_old.xml/App_old.xml(if present); these are the files used during last optimization task.
Boot.xml/App.xml.

OUTPUT:
Updated Boot_old.xml/App_old.xml, with files pre staged for compression.
Common.xml PROCEDURE:
Step 1: Read Boot_old.xml/App_old.xml, if it exists, else goto Step 4.
Step 2: Read Boot.xml/App.xml.
Step 3: For each entry in Boot.xml/App.xml, if it exists in Boot_old.xml/App_old.xml, remove the entry from Boot_old.xml/App_old.xml and save the entry with the respective values in another xml, common.xml.
Step 4: End.

In particular embodiments, once the merged data set has been analyzed, particular files may be selected and sorted for compression. In this step, the old merged data (for samples gathered during boot-up or during application runtime of the client device) is compared with the new merged data, and common files between the old and new datasets are determined. In particular embodiments, files in the new merged data set with a compression ratio of 1 (indicating that the file has not been compressed, or the file was already been uncompressed during the last optimization cycle) may be excluded from becoming candidates for compression. Additionally, files that are common to both the old merged data samples and the new merged data samples are excluded from becoming candidates for compression. For each of the file entries remaining in the current/new merged data set, the computational overhead weight for the file entry is calculated by multiplying the frequency of access for the file by the file size (e.g. in kilobytes). This calculated weight value is a measure of the appropriateness of the file as a candidate for uncompressing, as the greater the file size and the more frequent the access to the file, the greater the number of CPU cycles that will be spent on uncompressing the file every time it is accessed in the storage volume (e.g. if it is not compressed), and the lower the performance of the system. The calculated weight value for a file may be saved for each file entry (e.g. appended to the entry in the file for the merged data set), and the file entries may be sorted in descending order with respect to the calculated weight value, so that those entries with a higher weight value will be more likely to be uncompressed by this process than those entries with a lower weight value (e.g. lower on the list). In particular embodiments, the calculated weight value may be scaled over all the entries on a scale from 0 to 100 (e.g. where a higher weight value leads to a higher likelihood of being selected for compression). Example pseudocode for selecting files for compression (e.g. performed by an analyzer module of the tool or utility of the system of the client device, described herein) is as follows:

INPUT:
Boot.xml
OR
App.xml
Common.xml, if present
OUTPUT:
Updated Boot.xml/App.xml, this file will contain the list of files which can be processed.
PROCEDURE:
Step 1: Read Boot.xml/App.xml.
Step 2: Read Common.xml, if no common.xml, goto step 4.
Step 3: For each file in common.xml, remove the corresponding entry in Boot.xml/App.xml
Step 4: For each file entry, if the compression ratio (CR) is 1, remove the entry from Boot.xml/App.xml.
Step 5: For each file entry, get the file size (from Boot.xml/App/xml) and compute the weight by multiplying the File Size with the frequency and update the XML with a weight attribute of respective entry.
Step 6: Sort entries in Boot.xml/App.xml in the descending order, with respect to the Weight, and update Boot.xml/App.xml.

In particular embodiments, once the file or data entries have been sorted by some measure of performance (e.g. the calculated weight value described herein), a subset of those files listed in the merged data set (e.g. in the merged XML file) may be selected for compression or uncompressing. For example, in this phase, the files that should be uncompressed to enhance system performance may be identified based on a particular measure or degree of performance. The degree of performance desired is taken as an input, and the updated, merged and current data is read. The degree of performance is a number (e.g. between 0 and 100) that may determine the extent to which system performance is preferred over disk space usage. If the total file count in the current data set (e.g. the current merged data set) is N, and the degree of performance desired is X, then the count of those files to be uncompressed will be Y=(X*N)/100. Starting from the first entry in the sorted list of file entries in the merged data set, the first Y files from the current dataset may be marked (e.g. with a flag for each entry) for uncompression. Example pseudocode for marking files for uncompression (e.g. performed by an analyzer module of the tool or utility of the system of the client device, described herein) is as follows:

INPUT:
Boot.xml/App.xml
Degree of Performance (DoP): This is the value, input by the User, as to how much of a Performance gain does he need, on a scale of 1-100. 1 refers to least performance gain and 100 refer to maximum obtainable performance gain.
OUTPUT:
Boot.xml/App.xml, updated with appropriate un compression flags, for each entry.
PROCEDURE:
Step 1: Read the DoP.
Step 2: Read Boot.xml/App.xml
Step 3: Count the number of entries (FileCount) under Boot.xml/App.xml.
Step 4: Compute the Un compression File Count (UFC). UFC=(DoP*FileCount)/100, number rounded off to the nearest integer.
Step 5: For each entry in Boot.xml/App.xml, set the uncompression flag and decrement UFC, starting from the first entry, until UFC is 0.

In particular embodiments, if an optimization cycle (e.g. one or more of the steps described herein) has already been run, then files which have previously been uncompressed (e.g. marked by flags set in the entries corresponding to those files) and are not currently being actively used may be compressed. In particular embodiments, the comparison of the current merged dataset with a previous merged data set allows for an identification of such files. In particular embodiments, these identified files may be compressed using the "Compact" utility provided by MICROSOFT. Once the compression of these data files is over, the old or previous merged data set may be deleted. Example pseudocode for compressing particular files (e.g. performed by a compression module of the tool or utility of the system of the client device, described herein) is as follows:

INPUT:
Boot_old.xml/App_old.xml
OUTPUT:
Optimized experience.
PROCEDURE:
Step 1: Read Boot_old.xml/App_old.xml
Step 2: For each file in the list, compress.
Step 3: Delete Boot_old.xml/App_old.xml In particular embodiments, particular files may be selected for uncompressing based on flags set for the entries corresponding to those files in the current merged data set. Once the files flagged for uncompressing are uncompressed (e.g. using the "Compact" utility), the current data set is merged with the data common to the older data set and the current data set. The degree of performance index may also be removed in this phase, and the older data set XML file may be archived or designated as the last set of files which have been analyzed for optimization. Example pseudocode for compressing particular files (e.g. performed by an uncompressing module of the tool or utility of the system of the client device, described herein) is as follows:

INPUT:
Boot.xml/App.xml
OUTPUT:
Optimized experience.
PROCEDURE:
Step 1: Read Boot.xml/App.xml
Step 2: For each file in the list with the un compression flag set, un compress.
Step 3: Merge Boot.xml/App.xml and common.xml and save as Boot_old.xml/App_old.xml Particular embodiments are further described with reference to FIGS. 7-10. FIG. 8 is a representation of an exemplary Boot_old.xml/App_old.xml file. In a particular embodiment, a comparison process is used to identify entries in the Boot_old.xml/App_old.xml that are not present in the Boot.xml/App.xml file corresponding to FIG. 7. Such a process would identify File 20, File 21, File 22, and File 23. File 20, File 21, File 22, and File 23 are selected for compression. After the particular embodiment moves entries for files in common between Boot_old.xml/App_old.xml and Boot.xml/App.xml to Common.xml, Boot.xml/App.xml will only contain entries for files identified during in the most recent data samples, as depicted in FIG. 9A. The entries in Boot.xml/App.xml are filtered to remove files with a compression ratio 1:1. In this example, File 12 has a compression ratio of 1:1, and has been removed from Boot.xml/App.xml, as depicted in FIG. 9B. The weight of each entry is calculated and added as an attribute. The entries are then sorted by weight in descending order. The resulting data set is depicted in FIG. 9C. The files for uncompression can be selected from the set of entries depicted in FIG. 9C. In a particular embodiment, a degree of performance parameter may be supplied by the system user or administrator, or by a default value. In the particular embodiment, the degree of performance is expressed as a integer ranging from 0-100. The number of files to be uncompressed can be determined by the formula such as: (degree of performance parameter) *(number of entries suitable for uncompression)/100. In this example, using the data set depicted in FIG. 9C, and a degree of performance parameter of 67, the formula results in 2 files being selected. Thus, in the particular embodiment, the first two entries are selected for uncompression (File 8 and File 14). At this point, the files selected for compression may be compressed, and the files selected for uncompression may be uncompressed.

In particular embodiments, sample and file data may be stored in XML files. FIG. 10 depicts an XML schema used in by a particular embodiment. FIG. 11 is an example of an instance of a data set using the XML schema depicted in FIG. 10.

Figure 12:
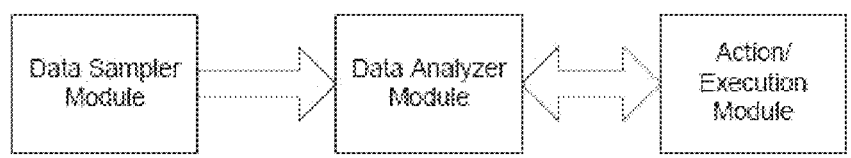
FIG. 12 depicts the architecture of a particular embodiment.

FIG. 12 depicts the architecture of a particular embodiment. A data sampler module monitors and collects information regarding files accessed during system boot or during the user application experience. The data sampler module is operable to create and merge data samples. A data analyzer module collects the data samples from the data sampler. The data analyzer module selects the files for compression and uncompression as disclosed herein. An action or execution module performs the compression and uncompression operations, and updates the reference data for use in the next optimization cycle. For example, a Boot.xml/App.xml file may be updated.

Figure 13:
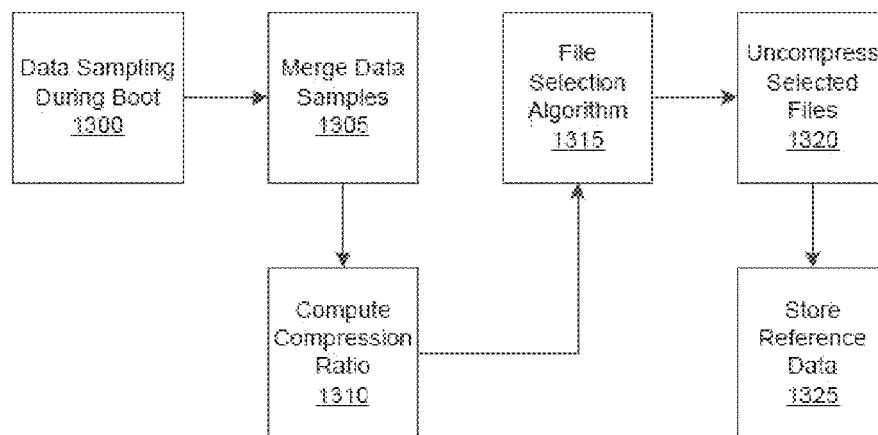
FIG. 13 is a flow chart illustrating the steps performed by a particular embodiment during an initial optimization of the system boot.

FIG. 13 is a flow chart illustrating the steps performed by a particular embodiment during an initial optimization of the system boot. At step 1300, data samples are collected during system boot. At step 1305, the collected data samples are merged. At step 1310, the compression ratio is calculated for each file identified in the data samples. At step 1315, the file selection algorithm selects the files identified in the data samples to be uncompressed. The file selection algorithm may assign a weight to each file that is based upon its size and its frequency of access. The algorithm may also receive a degree of performance parameter that is used in the file selection process. At step 1320, files selected by the algorithm are uncompressed. At step 1325, reference data is stored. For example, the reference data may comprise a Boot_old.xml file.

Figure 14:
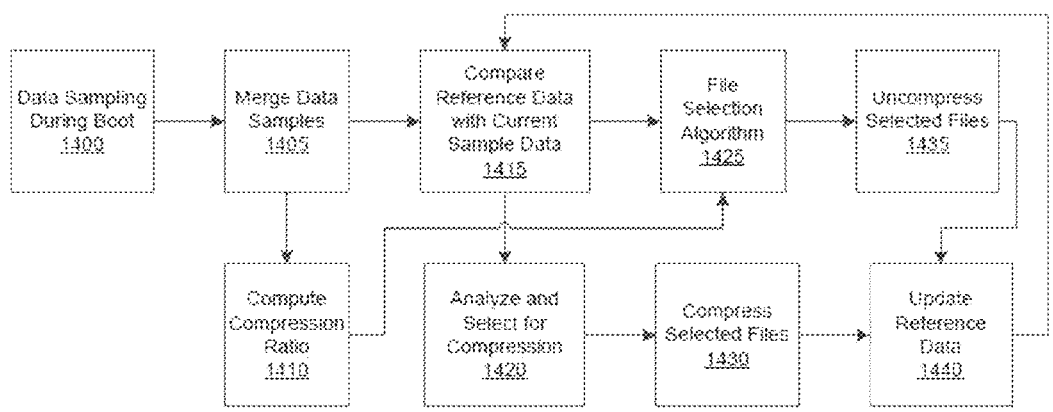
FIG. 14 is a flow chart illustrating the steps performed by a particular embodiment during subsequent optimizations of the system boot.

FIG. 14 is a flow chart illustrating the steps performed by a particular embodiment during subsequent optimizations of the system boot. At step 1400, data samples are collected during system boot. At step 1405, the collected data samples are merged. At step 1410, the compression ratio is calculated for each file identified in the data samples. At step 1415, which may be done in parallel, the reference data from the last optimization of the system boot is compared with the current data samples. At step 1420, files are selected for compression. For example, if a file was uncompressed during a previous system boot optimization (as determined from the reference data), but the same file was not identified in the current data samples, the file may be selected for compression. At step 1430, the files selected for compression are compressed, and the reference data is updated at step 1440. At step 1425, the data file selection algorithm receives the compared data from step 1415 and the computed compression ratios for the files identified in the current data samples from step 1410. The data file selection algorithm then selects files for uncompression. At step 1435, the selected files are uncompressed. At step 1440, the reference data is updated to account for the files that have been uncompressed.

Figure 15:
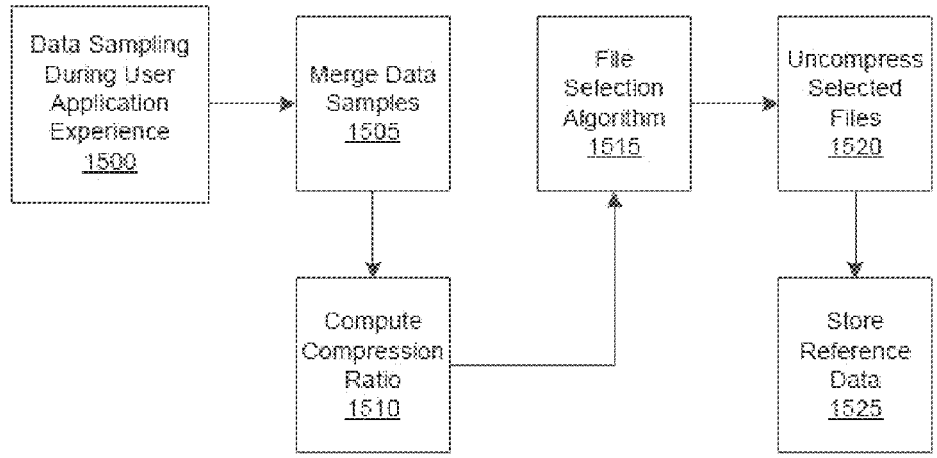
FIG. 15 is a flow chart illustrating the steps performed by a particular embodiment during an initial optimization of the user application experience.

FIG. 15 is a flow chart illustrating the steps performed by a particular embodiment during an initial optimization of the user application experience. At step 1500, data samples are collected during the user application experience. At step 1505, the collected data samples are merged. At step 1510, the compression ratio is calculated for each file identified in the data samples. At step 1515, the file selection algorithm determines the files identified in the data samples to be uncompressed. The file selection algorithm may assign a weight to each file that is based upon its size and its frequency of access. The algorithm may also receive a degree of performance parameter that is used in the file selection process. At step 1520, files selected by the algorithm are uncompressed. At step 1525, reference data is stored. For example, the reference data may comprise an App_old.xml file.

Figure 16:
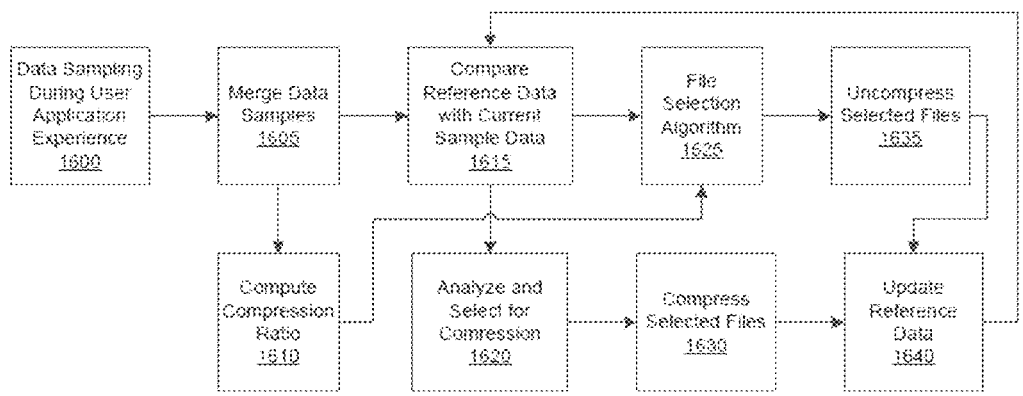
FIG. 16 is a flow chart illustrating the steps performed by a particular embodiment during subsequent optimizations of the user application experience.

FIG. 16 is a flow chart illustrating the steps performed by a particular embodiment during subsequent optimizations of the user application experience. At step 1600, data samples are collected during the user application experience. At step 1605, the collected data samples are merged. At step 1610, the compression ratio is calculated for each file identified in the data samples. At step 1615, which may be done in parallel, the reference data from the last optimization of the system boot is compared with the current data samples. At step 1620, files are selected for compression. For example, if a file was uncompressed during a previous user application experience optimization, as indicated by the reference data, but the same file was not identified in the current data samples, the file may be selected for compression. At step 1630, the files selected for compression are compressed, and the reference data is updated at step 1640. At step 1625, the data file selection algorithm receives the compared data from step 1615 and the computed compression ratios for the files identified in the current data samples from step 1610. The data file selection algorithm selects files for uncompression. At step 1635, the selected files are uncompressed. At step 1640, the reference data is updated to account for the files that have been uncompressed.

Figure 17:
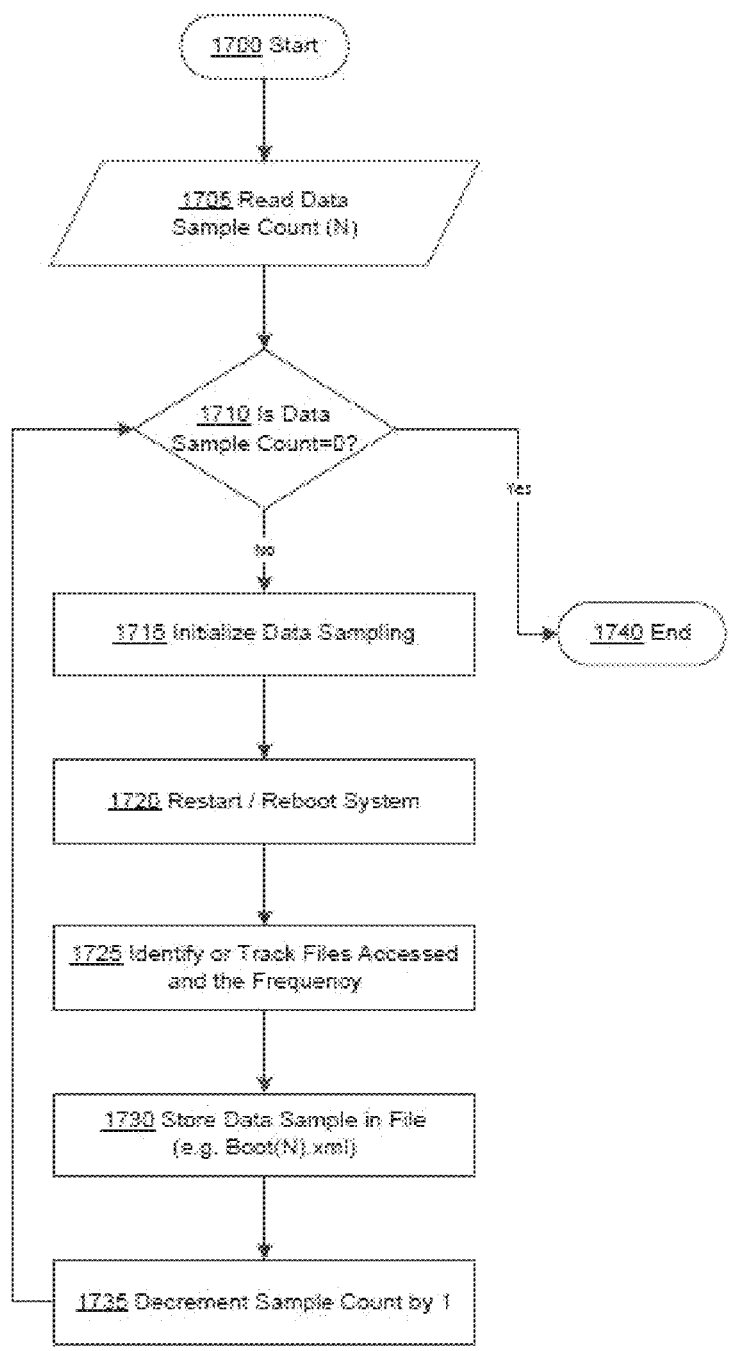
FIG. 17 is a flowchart illustrating the steps performed by a particular embodiment to collect data samples during a system boot.

FIG. 17 is a flowchart illustrating the steps performed by a particular embodiment to collect data samples during a system boot. At step 1700, the process starts. At step 1705, a data sample count is read. The data sample count (N) is a parameter that may be set by a user or may be a default value. At step 1710, if the data sample count is zero, the process ends at step 1740. If the data sample count is not zero, the sampling process is initialized at step 1715. At step 1720, the system is restarted or rebooted. At step 1725, the files retrieved during the system boot are identified, and the frequency of file access is tracked. At step 1730, after the system has booted, information about the files accessed, and the frequency of access, is stored in a file. At step 1735, the data sample count is decremented, and control passes back to step 1710.

Figure 18:
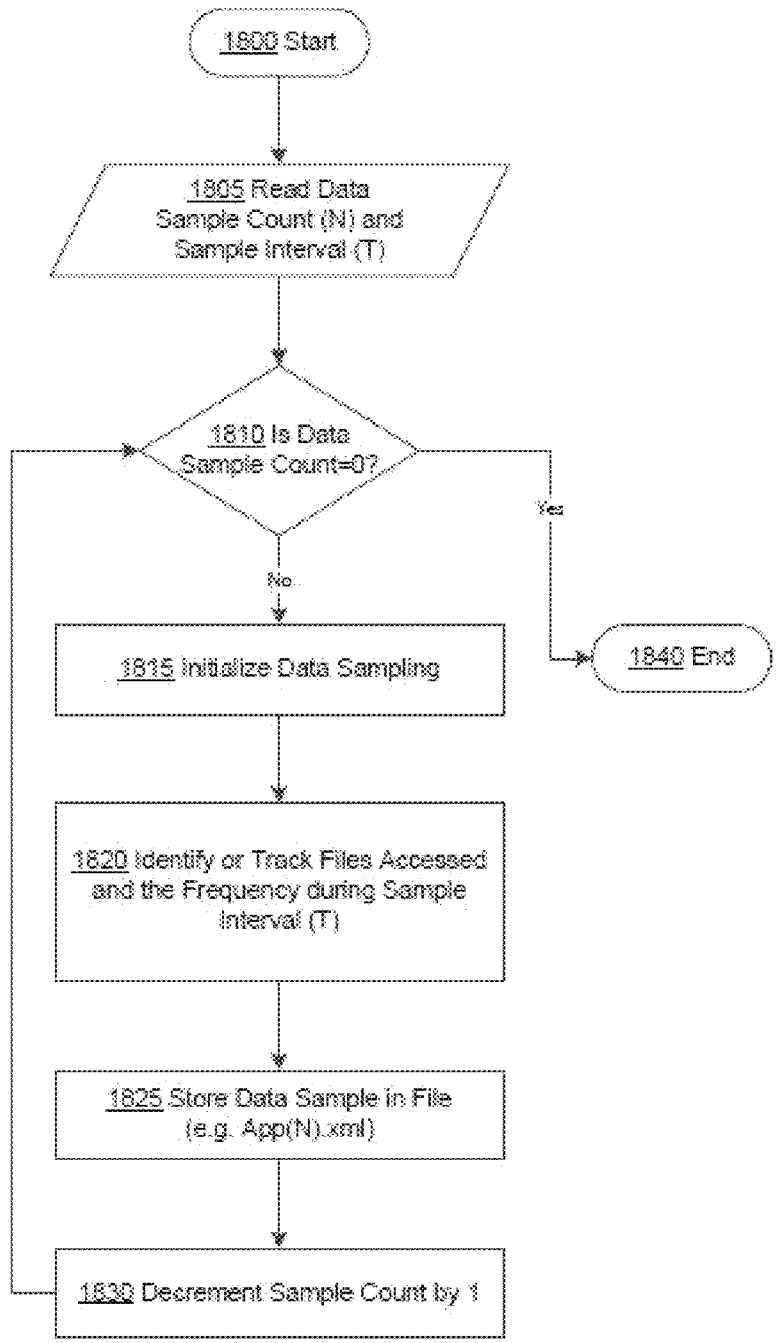
FIG. 18 is a flowchart illustrating the steps performed by a particular embodiment to collect data samples during the user application experience.

FIG. 18 is a flowchart illustrating the steps performed by a particular embodiment to collect data samples during the user application experience. At step 1800, the process starts. At step 1805, a data sample count (N) is read. The data sample count is a parameter that may be set by a user or administrator, or may be a default value. A sample interval (T) is also read. The sample interval is a parameter that may be set by a user or administrator, or may be a default value. At step 1810, if the data sample count is zero, the process ends at step 1840. If the data sample count is not zero, the sampling process is initialized at step 1815. At step 1820, the files retrieved during the user application experience during the sample interval are identified, and the frequency of file access is tracked. At step 1825, after the sample time interval is complete, information about the files accessed, and the frequency of access, is stored in a file. At step 1830, the data sample count is decremented, and control passes back to step 1810.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method of optimizing the performance of an information handling system comprising:
generating one or more data samples by:
rebooting the information handling system for a predetermined number of boot cycles, wherein the predetermined number of boot cycles is based, at least in part, on a predetermined number of data samples to be generated;
identifying one or more files accessed during the bootup of the information handling system for each reboot, wherein a separate data sample is generated for each reboot;
determining an access frequency for each of the identified one or more files accessed;
and storing an identifier and the access frequency for each of the identified one or more files accessed;
merging the one or more data samples into a merged data sample;
computing a compression ratio for each of the identified one or more files accessed in the merged data sample;
storing the compression ratio for each of the identified one or more files accessed in the merged data sample;
analyzing the one or more data samples and one or more previous data samples to determine which of the identified one or more files accessed are recently-used files and which of the identified one or more files accessed are new files;
selecting one or more of the identified one or more files accessed from the merged data sample for uncompression;
and uncompressing the selected one or more of the identified one or more files accessed for uncompression.

2. The method of claim 1, wherein selecting one or more of the identified one or more files accessed for umcompression further comprises:
determining a weight for each of the identified one or more files accessed in the merged data sample;
and selecting one or more of the identified one or more files accessed based upon the weight and a degree of performance.

3. The method of claim 2, wherein the weight for each identified one or more files accessed is determined by multiplying a file size of the identified one or more files accessed by the access frequency of the identified one or more files accessed.

4. The method of claim 1, further comprising:
comparing the merged data sample with a reference data;
selecting files identified in the reference data that are not identified in the merged data sample for compression;
compressing the selected files identified in the reference data for compression; and
replacing the reference data with the merged sample data.

5. The method of claim 1, wherein identifying one or more files accessed during the bootup of the information handling system comprises monitoring and collecting information about the identified one or more files accessed by a data sampler module.

6. The method of claim 1, wherein each data sample is stored in a file, wherein the file comprises identifying information of the identified one or more files accessed and the access frequency for each of the identified one or more files accessed.

7. The method of claim 1. wherein the number of one or more data samples generated is based upon a received parameter.

8. One or more computer-readable non-transitory storage media embodying logic that is operable when executed to:
generating one or more data samples by:
rebooting an information handling system for a predetermined number of boot cycles, wherein the predetermined number of boot cycles is based, at least in part, on a predetermined number of data samples to be generated;

identifying one or more files accessed during the bootup of the information handling system for each reboot, wherein a separate data sample is generated for each reboot;

determining an access frequency for each of the identified one or more files accessed;

and storing an identifier and the access frequency for each of the identified one or more files accessed;

merging the one or more data samples into a merged data sample;

computing a compression ratio for each of the identified one or more files accessed in the merged data sample;

storing the compression ratio for each of the identified one or more files accessed in the merged data sample;

analyzing the one or more data samples and one or more previous data samples to determine which of the identified one or more files accessed are recently-used files and which of the identified one or more files accessed are new files;

selecting one or more of the identified one or more files accessed from the merged data sample for uncompression;

and uncompressing the selected one or more of the identified one or more files accessed for uncompression.

9. The media of claim 8, wherein selecting one or more of the identified one or more files accessed for uncompression further comprises:

determining a weight for each of the identified one or more files accessed in the merged data sample;

and selecting one or more of the identified one or more files accessed based upon the weight and a degree of performance.

10. The media of claim 9, wherein the weight for each identified one or more files accessed is determined by multiplying a file size of the identified one or more files accessed by the access frequency of the identified one or more files accessed.

11. The media of claim 8, further comprising:

comparing the merged data sample with a reference data;

selecting files identified in the reference data that are not identified in the merged data sample for compression;

compressing the selected files identified in the reference data for compression; and replacing the reference data with the merged sample data.

12. The media of claim 8, wherein identifying one or more files accessed during the bootup of the information handling system comprises monitoring and collecting information about the identified one or more files accessed by a data sampler module.

13. The media of claim 8, wherein each data sample is stored in a file, wherein the file comprises identifying information of the identified one or more files accessed and the access frequency for each of the identified one or more files accessed.

14. The media of claim 8, wherein the number of one or more data samples generated is based upon a received parameter.

15. An information handling system comprising:

one or more processors; and a memory coupled to the processors comprising instructions executable by the processors, the processors being operable when executing the instructions to: generating one or more data samples by:

rebooting the information handling system for a predetermined number of boot cycles, wherein the predetermined number of boot cycles is based, at least in part, on a predetermined number of data samples to be generated;

identifying one or more flies accessed during the bootup of the information handling system for each reboot, wherein a separate data sample is generated for each reboot;

determining an access frequency for each of the identified one or more files accessed;

and storing an identifier and the access frequency for each of the identified one or more files accessed;

merging the one or more data samples into a merged data sample;

computing a compression ratio for each of the identified one or more files accessed in the merged data sample;

storing the compression ratio for each of the identified one or more files accessed in the merged data sample;

analyzing the one or more data samples and one or more previous data samples to determine which of the identified one or more files accessed are recently-used files and which of the identified one or more files accessed ace new files;

selecting one or more of the identified one or more files accessed from the merged data sample for uncompression;

and uncompressing the selected one or more of the identified one or more files accessed for uncompression.

16. The information handling system of claim 15, wherein selecting one or more of the identified one or more files accessed for uncompression further comprises:

determining a weight for each of the identified one or more files accessed in the merged data sample;

and selecting one or more of the identified one or more files accessed based upon the weight and a degree of performance.

17. The information handling system of claim 16, wherein the weight for each identified one or more files accessed is determined by multiplying a file size of the identified one or more files accessed by the access frequency of the identified one or more files accessed.

18. The information handling system of claim 15, further comprising:

comparing the merged data sample with a reference data;

selecting files identified in the reference data that are not identified in the merged data sample for compression;

compressing the selected files identified in the reference data for compression; and replacing the reference data with the merged sample data.

19. The information handling system of claim 15, wherein identifying one or more files accessed during the bootup of the information handling system comprises monitoring and collecting information about the identified one or more files accessed by a data sampler module.

20. The information handling system of claim 15, wherein the number of one or more data samples generated is based upon a received parameter.

* * * * *